(12) United States Patent
Harris

(10) Patent No.: US 11,002,390 B2
(45) Date of Patent: May 11, 2021

(54) FUEL FITTING

(71) Applicant: United Technologies Corporation, Farmington, CT (US)

(72) Inventor: Meggan Harris, Colchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 238 days.

(21) Appl. No.: 16/235,751

(22) Filed: Dec. 28, 2018

(65) Prior Publication Data

US 2019/0137014 A1 May 9, 2019

Related U.S. Application Data

(62) Division of application No. 15/028,135, filed as application No. PCT/US2015/012176 on Jan. 21, 2015, now abandoned.

(60) Provisional application No. 61/931,055, filed on Jan. 24, 2014.

(51) Int. Cl.

| *F16L 19/025* | (2006.01) |
| *F16L 13/14* | (2006.01) |
| *B22F 5/00* | (2006.01) |
| *F16L 33/24* | (2006.01) |
| *B22F 10/20* | (2021.01) |
| *B33Y 10/00* | (2015.01) |
| *B33Y 80/00* | (2015.01) |

(52) U.S. Cl.
CPC ............ *F16L 19/025* (2013.01); *B22F 5/009* (2013.01); *F16L 13/14* (2013.01); *F16L 33/24* (2013.01); *B22F 10/20* (2021.01); *B33Y 10/00* (2014.12); *B33Y 80/00* (2014.12)

(58) Field of Classification Search
CPC ............................... F16L 19/025; B22F 5/009
USPC ............................................................ 419/5
See application file for complete search history.

(56) References Cited

U.S. PATENT DOCUMENTS

| 4,893,844 A | 1/1990 | Chelette et al. |
| 6,026,804 A | 2/2000 | Schardt et al. |
| 2004/0124273 A1* | 7/2004 | Koss ................. F23R 3/283 |
| | | 239/533.2 |

(Continued)

FOREIGN PATENT DOCUMENTS

| DE | 2111705 A1 | 9/1972 |
| WO | WO8502450 A1 | 6/1985 |
| WO | WO0157425 A1 | 8/2001 |

OTHER PUBLICATIONS

Extended European Search Report for EP Application No. 15740379. 1, dated Jan. 17, 2017, 9 Pages.

(Continued)

*Primary Examiner* — Weiping Zhu
(74) *Attorney, Agent, or Firm* — Kinney & Lange, P.A.

(57) ABSTRACT

A fuel fitting assembly includes a monolithic fuel fitting formed by additive manufacturing. The fitting includes a first end, a second end, a conduit extending axially through the fitting from the first end to the second end, and a first sealing element. The first end is to be connected to a fuel line. The second end is to be connected to a device requiring or providing fuel. The first sealing element includes a sealing seat circumferentially surrounding the conduit at the second end of the fitting. The fuel fitting is integrally formed as a stack of layers of material.

8 Claims, 5 Drawing Sheets

(56) References Cited

U.S. PATENT DOCUMENTS

| | | | |
|---|---|---|---|
| 2008/0029068 A1* | 2/2008 | Graham | ............... F02C 7/222 |
| | | | 123/456 |
| 2009/0255602 A1 | 10/2009 | McMasters et al. | |
| 2013/0298403 A1 | 11/2013 | Thomson et al. | |
| 2013/0318975 A1 | 12/2013 | Stoia et al. | |

OTHER PUBLICATIONS

International Preliminary Report on Patentability, for PCT Patent Application No. PCT/US2015/012176, dated Jul. 26, 2016, 10 pages.

International Search Report and Written Opinion, International Application No. PCT/US2015/012176, dated May 4, 2015, 12 pages.

\* cited by examiner

FUEL FITTING

CROSS-REFERENCE TO RELATED APPLICATION(S)

This application is a divisional of U.S. application Ser. No. 15/028,135, filed Apr. 8, 2016 for "Fuel Fitting" by M. Harris, which is a 371 of PCT/US2015/012176, filed Jan. 21, 2015, for "Fuel Fitting", by M. Harris, which in turn claims the benefit of U.S. Provisional Application No. 61/931,055, filed Jan. 24, 2014, for "Fuel Fitting" by M. Harris.

BACKGROUND

The present invention relates to fuel fittings. A fuel fitting may connect a fuel line to a device requiring fuel, for example a fuel injector in a gas turbine engine. A fuel fitting may also connect a fuel line to a device supplying fuel, such as a fuel manifold. Fuel fittings for unique, or low production volume, applications typically must be machined from bar stock. Such fuel fittings are thus relatively costly and require long lead-times to produce. A more economical method of manufacturing fuel fittings is desired.

SUMMARY

An embodiment of the present invention is a method for manufacturing a monolithic fuel fitting. The method includes building the fuel fitting by a layer-by-layer additive manufacturing process. The method also includes forming, while building the fitting, a first end, a second end opposite the first end, and a conduit extending axially through the fitting from the first end to the second end. The method includes integrally forming a first sealing element including a sealing seat circumferentially surrounding the conduit at the second end of the fitting.

Another embodiment of the present invention is a fuel fitting assembly including a monolithic fuel fitting formed by additive manufacturing. The fitting includes a first end, a second end, a conduit extending axially through the fitting from the first end to the second end, and a first sealing element. The first end is to be connected to a fuel line. The second end is to be connected to a device requiring or providing fuel. The first sealing element includes a sealing seat circumferentially surrounding the conduit at the second end of the fitting. The fuel fitting is integrally formed as a stack of layers of material.

DETAILED DESCRIPTION

Figure 1:
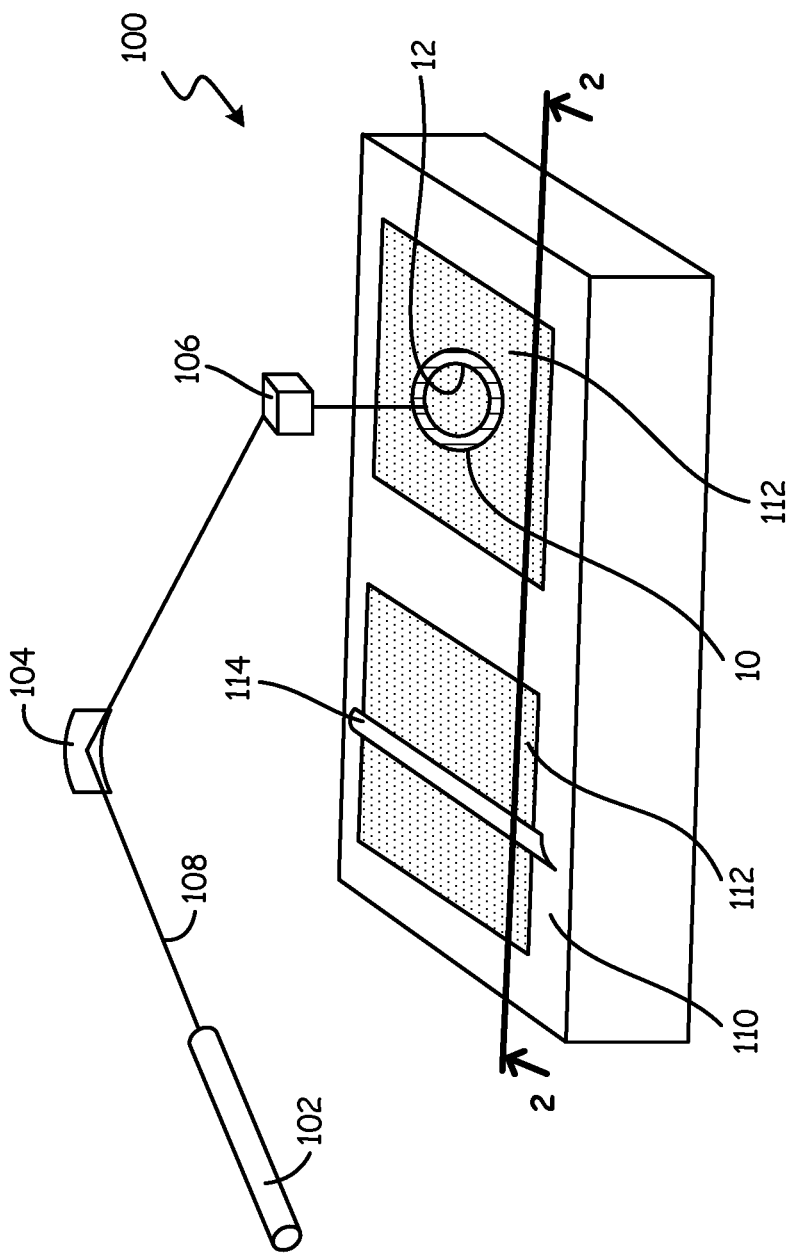
FIG. 1 is a perspective view of an additive manufacturing apparatus.

FIG. 1 shows additive manufacturing apparatus 100 suitable for use in the manufacture of fuel fitting 10 including at least one integral sealing element. In particular, FIG. 1 shows an additive manufacturing apparatus which uses laser additive manufacturing to create a three-dimensional object out of sinterable, pulverant material. While direct metal laser sintering (DMLS) is described, other additive manufacturing techniques may be employed.

Additive manufacturing apparatus 100 includes a set of optical components, including laser 102, mirror 104, and moving optical head 106, which guide laser beam 108. Laser 102 may be any source of heating radiation, such as a $CO_2$ laser. Additive manufacturing apparatus 100 also includes frame 110, pulverant material 112, and coater 114, which are used for powder containment and application. Pulverant material 112 may be any material suitable for use as a fuel fitting. Typically, pulverant material 112 will be a metal or metal alloy. For example, pulverant material 112 may be a nickel alloy. As shown in FIG. 1, fuel fitting 10 includes conduit 12.

Laser 102 creates a laser beam which can be used for melting, sintering, or cutting. Laser 102 is pointed towards mirror 104, which is arranged to deflect incident radiation toward moving optical head 106. In operation, laser 102 emits laser beam 108, which is deflected by mirror 104 and moving optical head 106 to selectively melt, sinter, or cut. Generally, laser beam 108 will be targeted within frame 110, which holds pulverant material 112. Coater 114 is arranged along a surface of frame 110, and may be moved across the surface of frame 110. Coater 114 may be, for example, a knife blade or a roller. As shown in FIG. 1, fuel fitting 10, including conduit 12, is present inside frame 110.

In operation, laser beam 108 is generated by laser 102. Laser beam 108 is deflected by mirror 104 towards moving optical head 106. Moving optical head 106 directs laser beam 108 towards areas within frame 110 that include pulverant material 112 which are melted or sintered. The areas melted or sintered form a layer of fuel fitting 10 as shown in FIG. 1. A void may be created within partially built fuel fitting 10 to form conduit 12.

After each layer of fuel fitting 10 is finished, component support 116 (shown in FIG. 2) holding fuel fitting 10 is lowered by the thickness of one layer of pulverant material 112, additional pulverant material 112 is added on top of the existing structures using coater 114, and the process is repeated. By repeating the process many times, a layer-by-layer object, such as fuel fitting 10 including conduit 12, may be manufactured.

Figure 2:
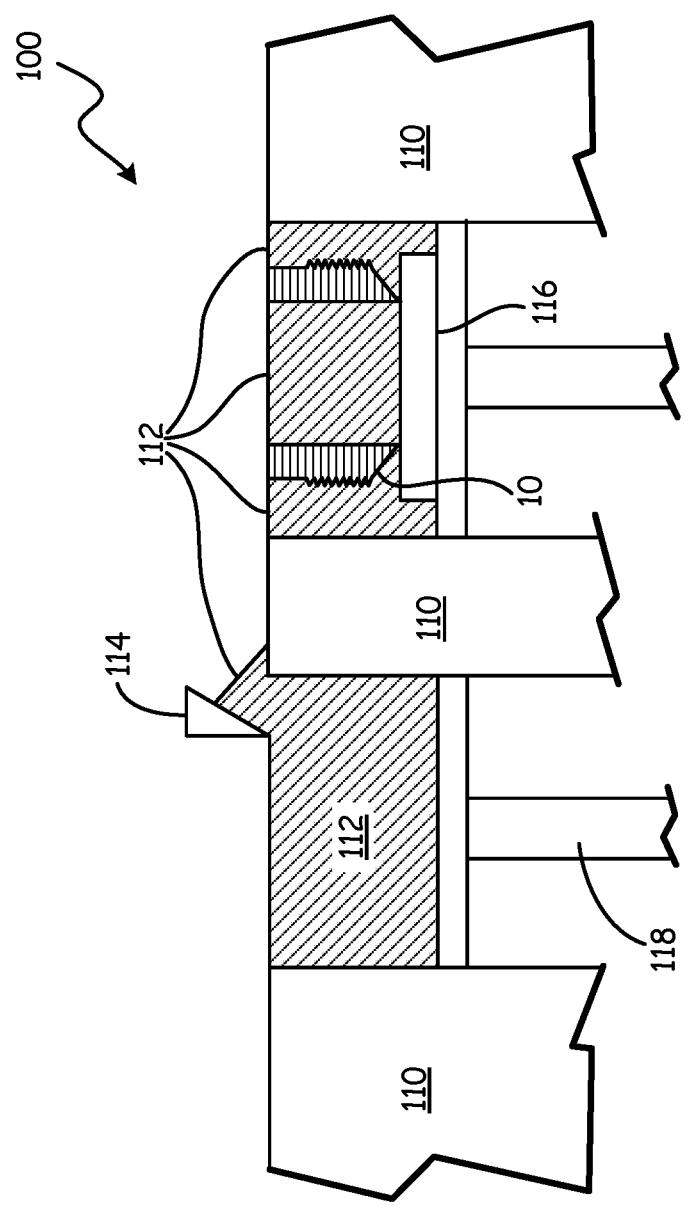
FIG. 2 is a cross-sectional view of the additive manufacturing apparatus of FIG. 1, taken along line 2-2.

FIG. 2 shows additive manufacturing apparatus 100 of FIG. 1, taken along line 2-2. FIG. 2 is a cutaway view that shows the operation of additive manufacturing apparatus 100. FIG. 2 shows a DMLS apparatus, but it will be understood by those skilled in the art that other additive manufacturing techniques and apparatuses may be used including, for example, laser powder deposition.

Additive manufacturing apparatus 100 as shown in FIG. 2 illustrates many of the same parts as those shown in FIG. 1, such as frame 110, pulverant material 112, coater 114, and partially built fuel fitting 10. FIG. 2 also shows component support 116 and material supply support 118. Component support 116 may be used to raise or lower partially built fuel fitting 10. Material supply support 118 may be raised to elevate or lower pulverant material 112 above the working surface of frame 110.

FIG. 2 shows the arrangement of component support 116 and material supply support 118 in addition to the arrangement of parts shown in FIG. 1. As can be seen in FIG. 2, partially built fuel fitting 10 rests on component support 116. Likewise, pulverant material 112 rests on material supply support 118.

As each layer of partially built fuel fitting 10 is melted or sintered, component support 116 is lowered and material supply support 118 is raised. Coater 114 scrapes a layer of pulverant material 112 off of the top of the supply side and applies it in a layer across the top of partially built fuel fitting 10. The process is then repeated until fuel fitting 10 is complete.

FIG. 2 shows one possible way of additively manufacturing fuel fitting 10 embodying the present invention, as well as embodiments described below in reference to FIGS. 3A, 3B, and 4. Alternative methods for additively manufacturing components are possible. For example, selective laser sintering, electron beam melting, laser powder deposition, or electron beam wire manufacturing may be used to create objects in an additive fashion. In all cases, fuel fitting 10 includes at least one integral sealing element and is integrally formed as a stack of layers of material to create a monolithic structure, that is, a structure integrally formed as a single piece.

Figure 3A:
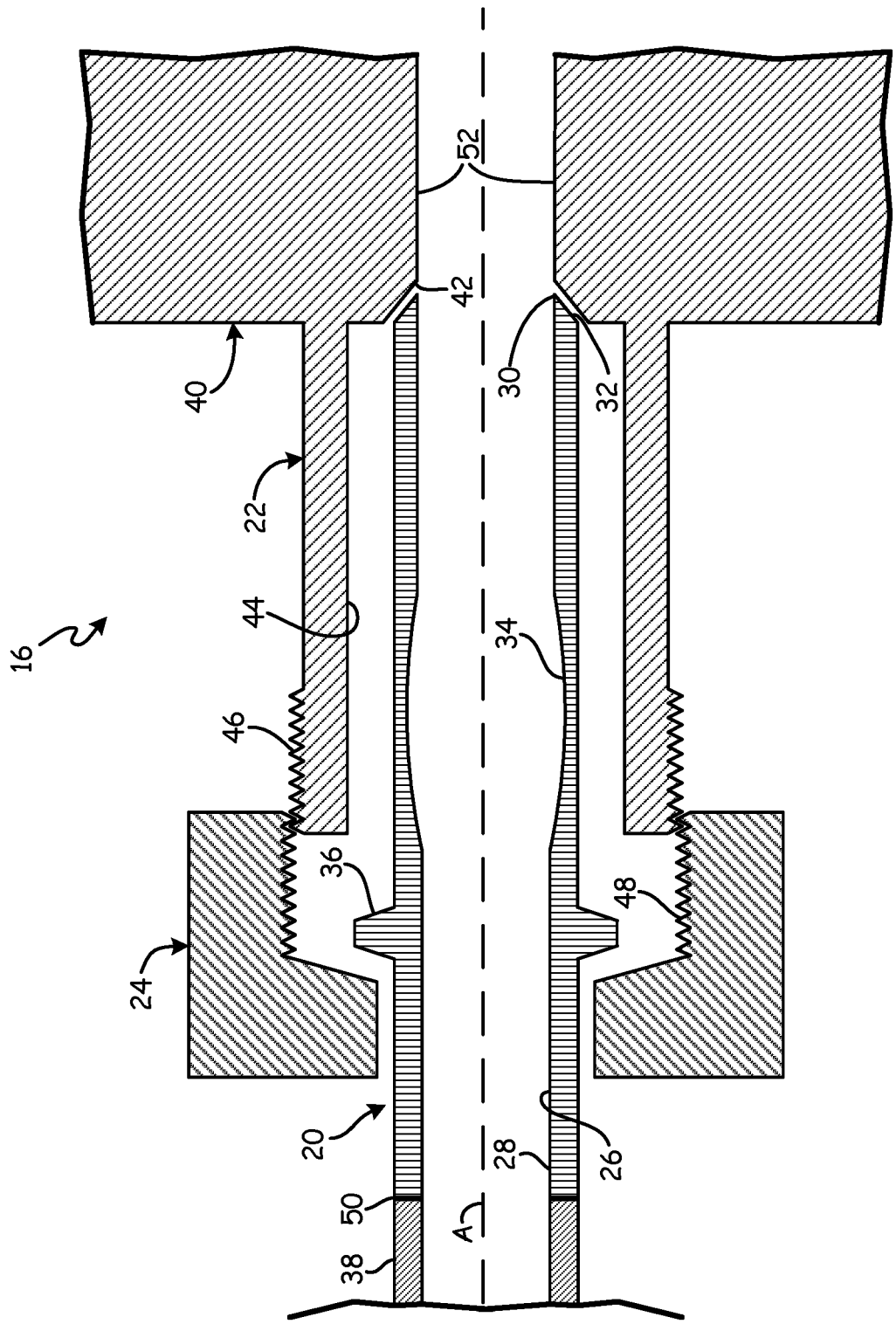
FIGS. 3A and 3B are side cross-sectional views of a fuel fitting assembly including a monolithic fuel fitting having integral sealing elements before and after application of axial compression, respectively.
Figure 3B:
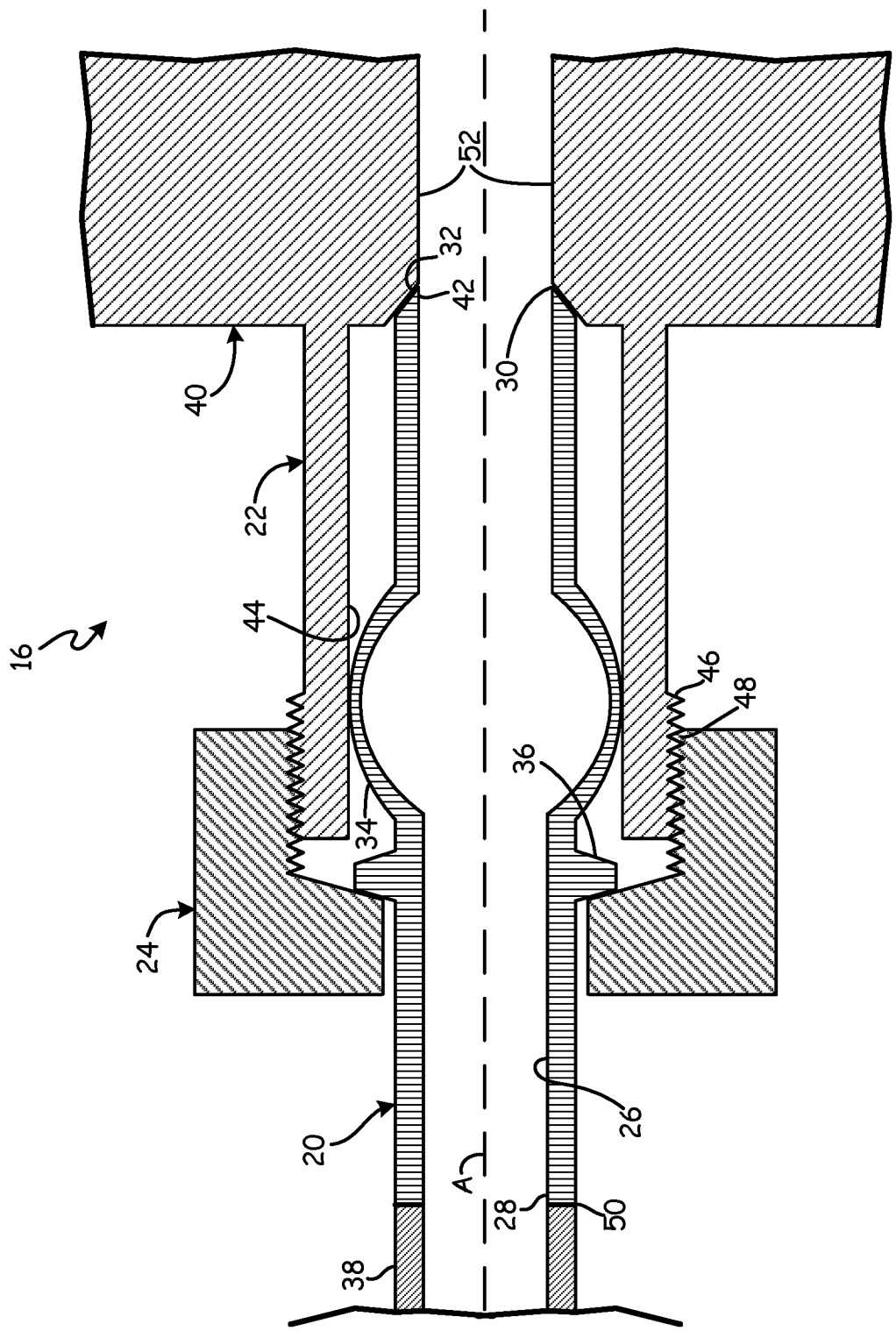

FIGS. 3A and 3B are side cross-sectional views of fuel fitting assembly 16 including monolithic fuel fitting 20 having two integral sealing elements. FIG. 3A illustrates fuel fitting assembly 16 before the application of axial compression to fuel fitting 20 with sealing elements not yet engaged. As shown in FIG. 3A, fuel fitting assembly 16 includes fuel fitting 20, cylindrical wall 22, and tube nut 24. Fuel fitting 20 has a generally cylindrical shape that defines axis A. Fuel fitting 20 includes conduit 26 extending axially through fuel fitting 20 from first end 28 to second end 30 opposite first end 28. Fuel fitting 20 further includes sealing seat 32 which is a first sealing element, thin-walled portion 34 which is a second sealing element, and flange 36. FIG. 3A also illustrates fuel line 38 and fuel device 40. Fuel line 38 is a line for containing a flow of fuel. Fuel device 40 is a device that either requires fuel from fuel line 38, such as fuel injector; or a device that provides fuel to fuel line 38, such as a fuel manifold. Fuel device 40 includes first sealing surface 42. Cylindrical wall 22 projects from fuel device 40 and includes second sealing surface 44, and device threads 46. Tube nut 24 includes nut threads 48.

Sealing seat 32 is a sealing surface that circumferentially surrounds conduit 26 at second end 30. Sealing seat 32 may be a conic section, as shown in FIG. 3A. Thin-walled portion 34 is a thinner portion of fuel fitting 20 that extends circumferentially around axis A. Flange 36 projects radially outward from fuel fitting 20 and extends circumferentially around axis A. First end 28 is shaped as necessary to connect to fuel line 38 by weld 50.

Cylindrical wall 22 projects from fuel device 40 and circumferentially surrounds opening 52 in fuel device 40 through which fuel is to pass. First sealing surface 42 also circumferentially surrounds opening 52, and is radially inward from cylindrical wall 22. First sealing surface 42 may be a conic section, as shown in FIG. 3A. Second sealing surface 44 is a radially inward facing surface of cylindrical wall 22. In the embodiment shown in FIG. 3A, device threads 46 are disposed on a radially outward facing surface of cylindrical wall 22. Nut threads 48 are disposed on a radially inward facing surface of tube nut 24. Device threads 46 and nut threads 48 are designed to threadedly engage.

FIG. 3A illustrates fuel fitting 20 as nut threads 48 of tube nut 24 begin to engage device threads 46 before the application of axial compression to fuel fitting 20. As nut threads 48 continue to threadedly engage device threads 46, tube nut 24 presses against flange 36 to apply axial compression to fuel fitting 20 and force sealing seat 32 into contact with sealing surface 42 to form a first seal between fuel fitting 20 and fuel device 40.

FIG. 3B illustrates fuel fitting 20 after sealing seat 32 contacts sealing surface 42, and nut threads 48 continue to threadedly engage device threads 46. As shown in FIG. 3B, thin-walled portion 34 flexes under the axial compression between tube nut 24 acting on flange 36, and fuel device 40 acting on sealing seat 32 at first sealing surface 42. Thin-walled portion 34 is designed such that under such axial compression, thin-walled portion 34 flexes, or bulges, radially outward around the circumference of fuel fitting 20 to contact second sealing surface 44 of cylindrical wall 22 to form a second seal between fuel fitting 20 and fuel device 40. So installed, fuel may flow between fuel device 40 and fuel line 38 by way of conduit 26. Leakage of fuel between fuel fitting 20 and fuel device 40 is prevented by the first sealing element, seal surface 28; and the second sealing element, thin-walled portion 34.

The embodiment shown in FIGS. 3A and 3B is manufactured by a layer-by-layer additive manufacturing process as described above in reference to FIGS. 1 and 2. Additive manufacturing processes allow the complex, tailored geometries of fuel fitting 20, including sealing seat 32 and thin-walled portion 34, to be realized. With additive manufacturing processes, fuel fitting 20 may be produced faster, with better dimensional control, and at significantly lower cost than machining from bar stock.

Figure 4:
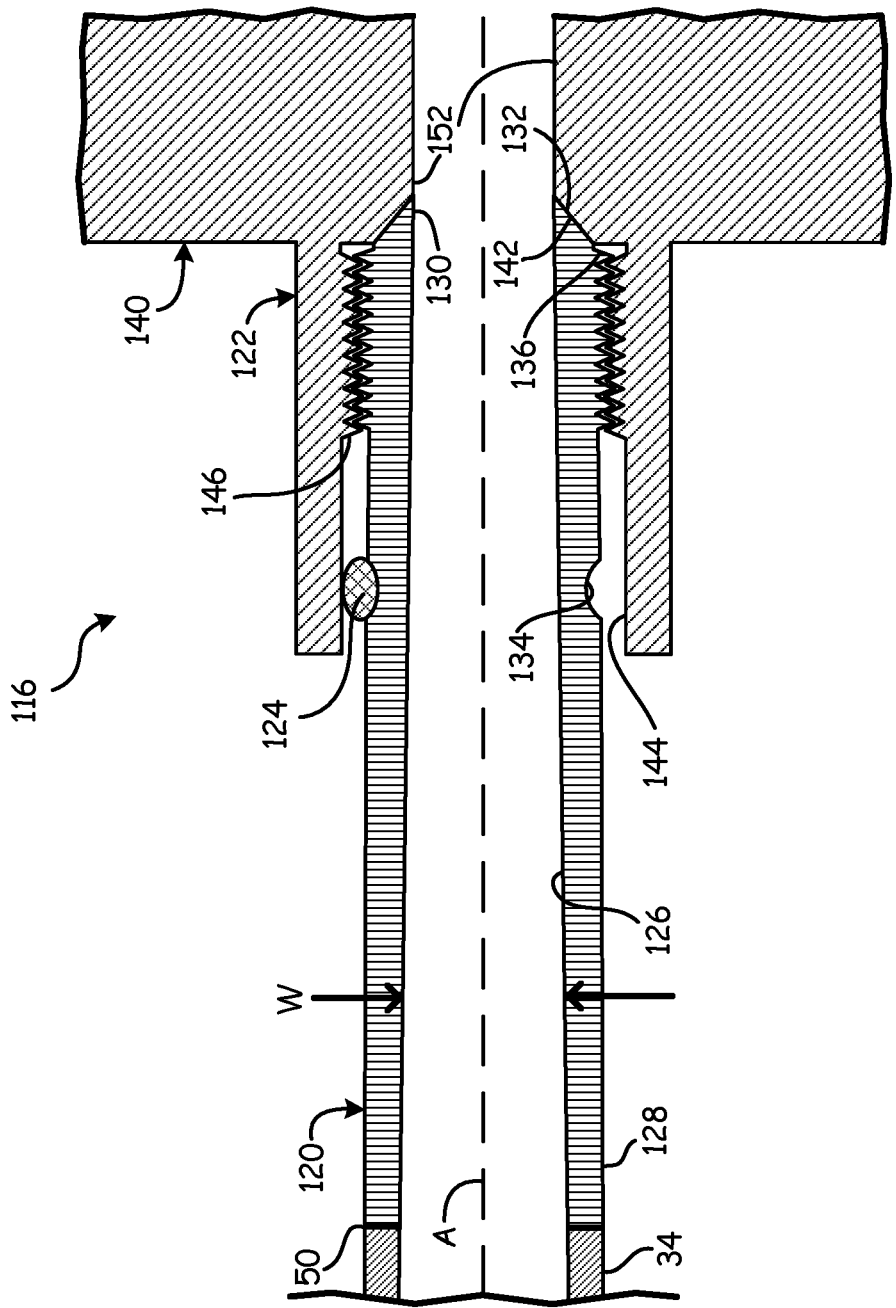
FIG. 4 is a side cross-sectional view of a fuel fitting assembly including a monolithic fuel fitting in which a diameter of a conduit passing axially through the fitting decreases along a length of the conduit for increasing fluid flow velocity along the length of the conduit.

FIG. 4 is a side cross-sectional view of fuel fitting assembly 116 including monolithic fuel fitting 120 in which a width of a conduit passing axially through the fitting decreases along a length of the conduit for increasing fluid flow velocity along the length of the conduit. As with the embodiment described above in reference to FIGS. 3A and 3B, the embodiment shown in FIG. 4 monolithic fuel fitting 120 includes two sealing elements.

As shown in FIG. 4, fuel fitting assembly 116 includes fuel fitting 120, cylindrical wall 122, and O-ring 124. Fuel fitting 120 has a generally cylindrical shape that defines axis A. Fuel fitting 120 includes conduit 126 extending axially through fuel fitting 120 from first end 128 to second end 130 opposite first end 128. Fuel fitting 120 further includes sealing seat 132 which is a first sealing element, O-ring channel 134 which is a second sealing element, and fitting threads 136. FIG. 4 also illustrates fuel line 38 and fuel device 140. Fuel line 38 is a line for containing a flow of fuel. Fuel device 140 is a device that either requires fuel from fuel line 38, such as fuel injector; or provides fuel to fuel line 38, such as a fuel manifold. Fuel device 140 includes first sealing surface 142. Cylindrical wall 122 projects from fuel device 140 and includes second sealing surface 144, and device threads 146. O-ring 124 is a ring-shaped structure made of an elastomeric material.

Sealing seat 132 is a sealing surface that circumferentially surrounds conduit 126 at second end 130. Sealing seat 132 may be a conic section, as shown in FIG. 4. O-ring channel 134 is a semi-circular shaped channel in an exterior surface of fuel fitting 120 that extends circumferentially around axis A. Fitting threads 136 are also disposed on the exterior surface of fuel fitting 120, but at an axial location different from O-ring channel 134. First end 128 is shaped as necessary to connect to fuel line 38 by weld 50.

Cylindrical wall 122 projects from fuel device 40 and circumferentially surrounds opening 52 in fuel device 140 through which fuel is to pass. First sealing surface 142 also circumferentially surrounds opening 52, and is radially inward from cylindrical wall 122. First sealing surface 142 may be a conic section, as shown in FIG. 4. Second sealing surface 144 is a radially inward facing surface of cylindrical wall 122. In the embodiment shown in FIG. 4, device threads 146 are disposed on a radially inward facing surface of cylindrical wall 122. Device threads 146 and fitting threads 136 are designed to threadedly engage.

O-ring 124 is installed partially within O-ring channel 134 prior to the engagement of fitting threads 136 with device threads 146. O-ring 124 is illustrated only in the upper half of FIG. 4, so that O-ring channel 134 may be shown more clearly in the lower half of FIG. 4. O-ring channel 134 holds O-ring 124 in position. So installed and in an uncompressed state, O-ring 124 projects radially from the exterior of fuel fitting 120 to a diameter greater than the diameter of sealing surface 144. Thus, as fitting threads 136 threadedly engage device threads 146, O-ring 124 is compressed against sealing surface 144 to form a second seal between fuel fitting 120 and fuel device 140. As fitting threads 136 continue to engage device threads 146, sealing seat 132 is forced into contact with sealing surface 142 to form a first seal between fuel fitting 120 and fuel device 140. So installed, fuel may flow between fuel device 140 and fuel line 38 through conduit 126. Leakage of fuel between fuel fitting 120 and fuel device 140 is prevented by the first sealing element, sealing seat 132; and the second sealing element, O-ring channel 134 containing O-ring 124.

As shown in FIG. 4, conduit 126 has a diameter, or width W, that varies along a length of conduit 126 to change fluid flow velocity along the length of conduit 126. In the particular embodiment illustrated in FIG. 4, the variation of width W is a decrease from fuel line 38 to fuel opening 52. In this way, a velocity of fluid flowing, for example, from fuel line 38 to fuel device 140 increases from fuel line 38 to fuel device 140. This feature is useful, for example, under conditions where heat proximate to fuel fitting 120 increases along the length of fuel fitting 120 and increasing the fluid flow velocity along conduit 126 reduces the time spent in a portion of fuel fitting 120 exposed to the increased heat.

While the embodiment of FIG. 4 illustrates the case in which width W of conduit 126 decreases along a length of conduit 126, it is understood that by symmetry, the present invention encompasses embodiments in which width W of conduit 126 increases along a length of conduit 126. In addition, a variation of width W along a length of conduit 126 may include both increases and decreases in width W of conduit 126 to change fluid flow velocity along the length of conduit 126.

Fuel fitting 120 shown FIG. 4 is manufactured by a layer-by-layer additive manufacturing process as described above in reference to FIGS. 1 and 2. Additive manufacturing processes allow the complex, tailored geometries of fuel fitting 120, including conduit 126 having width W varying along the length of conduit 126, sealing seat 132, and O-ring channel 134, to be realized. With additive manufacturing processes, fuel fitting 120 may be produced faster, with better dimensional control, and at significantly lower cost than machining from bar stock.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

Discussion of Possible Embodiments

The following are non-exclusive descriptions of possible embodiments of the present invention.

A method for manufacturing a monolithic fuel fitting includes building the fuel fitting by a layer-by-layer additive manufacturing process. The method also includes forming, while building the fitting, a first end, a second end opposite the first end, and a conduit extending axially through the fitting from the first end to the second end. The method includes integrally forming a first sealing element including a sealing seat circumferentially surrounding the conduit at the second end of the fitting.

The method of the preceding paragraph can optionally include, additionally and/or alternatively, any one or more of the following features, configurations, and/or additional components:

integrally forming a second sealing element, the second sealing element including a thinner portion of a fuel fitting wall such that when the fuel fitting is under axial compression, the thinner portion bulges radially outward;

integrally forming a second sealing element, the second sealing element including an O-ring channel, the channel extending circumferentially around an exterior of the fitting;

the O-ring channel has a semi-circle shape in circumferential cross-section;

a width of the conduit varies along a length of the conduit to change fluid flow velocity along the length of the conduit;

additively manufacturing includes using laser powder deposition; and additively manufacturing includes using direct metal laser sintering.

A fuel fitting assembly includes a monolithic fuel fitting formed by additive manufacturing. The fitting includes a first end, a second end, a conduit, and a first sealing element. The first end is to be connected to a fuel line. The second end is to be connected to a device requiring or providing fuel. The conduit extends axially through the fitting from the first end to the second end. The first sealing element includes a sealing seat circumferentially surrounding the conduit at the second end of the fitting. The fuel fitting is integrally formed as a stack of layers of material.

The fuel fitting assembly of the preceding paragraph can optionally include, additionally and/or alternatively, any one or more of the following features, configurations, and/or additional components:

a second sealing element including a thin-walled portion of the fitting circumferentially surrounding the conduit, such that the thin-walled portion bows radially outward when the fitting is place under axial compression;

a tube nut including nut threads, a cylindrical wall circumferentially surrounding an opening in the device through which fuel is to pass, the cylindrical wall projecting from the device, and including device threads for engaging the nut threads, and a flange radially projecting radially outward from the fitting, in which the fitting is placed under axial compression by engagement between the nut threads and the device threads to force the tube nut against the flange, the axial compression forcing the sealing seat into contact with the device to form a first seal, and forcing the thin-walled portion into contact with the cylindrical wall to form a second seal;

a second sealing element including an O-ring channel, the channel extending circumferentially around an exterior of the fitting;

the O-ring channel has a semi-circle shape in circumferential cross-section;

an O-ring partially contained by the O-ring channel, a cylindrical wall circumferentially surrounding an opening in the device through which fuel is to pass, the cylindrical wall projecting from the device, and including device threads, and the fitting further includes fitting threads for engaging the device threads in which engagement between the fitting threads and the device threads forces the sealing seat into contact with the device to form a first seal, and forces the O-ring into contact with the cylindrical wall to form a second seal;

the fitting is made of a sintered metal;

the fitting is made of a nickel alloy;

a width of the conduit decreases along a length of the conduit to increase fluid flow velocity within the conduit along the length of the conduit; and a width of the conduit increases along a length of the conduit to decrease fluid flow velocity within the conduit along the length of the conduit.

The invention claimed is:

1. A fuel fitting assembly comprising:
   an outer cylindrical wall with threads on an outer side;
   a tube nut including an inward projection and threads on an inner side configured to threadedly engage the outer cylindrical wall;
   a monolithic fuel fitting disposed at least partially radially inward from the outer cylindrical wall, the monolithic fuel fitting including:
      a first end configured to be connected to a fuel line;
      a second end configured to be connected to a device requiring or providing fuel;
      a conduit extending axially through the outer cylindrical wall between the first end and the second end and having a thin-walled portion radially inward from the outer cylindrical wall;
      a first sealing element situated at the second end that includes a circumferential sealing seat; and
      a flange extending outward from the conduit between the first end of the monolithic fuel fitting and thin-walled portion of the conduit,
   wherein the circumferential seal seat is in contact with and seals to the device requiring or providing fuel and the thin-walled portion of the conduit bows outward to contact and seal to an inner side of the outer cylindrical wall when the flange is forced towards the second end of the monolithic fuel fitting by the inward projection of the tube nut when the tube nut threadedly engages the outer cylindrical wall.

2. The assembly of claim 1, wherein the fitting further comprises another sealing element, wherein the sealing element includes an O-ring channel, the channel extending circumferentially around an exterior of the conduit.

3. The assembly of claim 2, wherein the O-ring channel has a semi-circle shape in circumferential cross-section.

4. The assembly of claim 2, further comprising:
   an O-ring partially contained by the O-ring channel and in contact with the inner side of the outer cylindrical wall such that a seal is formed between the O-ring and the inner side of the outer cylindrical wall.

5. The assembly of claim 1, wherein the fitting is made of a sintered metal.

6. The assembly of claim 1, wherein the fitting is made of a nickel alloy.

7. The assembly of claim 1, wherein a width of the conduit decreases along a length of the conduit to increase fluid flow velocity within the conduit along the length of the conduit.

8. The assembly of claim 1, wherein a width of the conduit increases along a length of the conduit to decrease fluid flow velocity within the conduit along the length of the conduit.

* * * * *